Patented Apr. 22, 1947

2,419,488

UNITED STATES PATENT OFFICE 2,419,488

PRODUCTION OF MONOCHLORO DERIVATIVES OF UNSATURATED NITRILES

Harris A. Dutcher, Borger, Tex., assignor to Phillips Petroleum Company, a corporation of Delaware No Drawing. Application June 5, 1944, Serial No. 538,880

11 Claims. (Cl. 260—464)

The present invention relates to the production of chlorine derivatives of unsaturated nitriles by the reaction of acetylene or acetylenic hydrocarbons with cyanogen chloride. More particularly the invention relates to the production of 3-chloroacrylonitrile (2-chlorovinyl cyanide, Cl—CH=CH—CN)

and similar monochloro derivatives of unsaturated nitriles, by the reaction of acetylene or acetylenic hydrocarbons and cyanogen chloride.

The principal object of the present invention is to provide a process for the production of monochloro derivatives of unsaturated nitriles, such as 3-chloroacrylonitrile, by the reaction of acetylene and cyanogen chloride.

Another object of the present invention is to provide a catalyst for promoting the addition reaction of cyanogen chloride and acetylenic hydrocarbons.

Other objects and advantages of the invention, some of which are referred to more specifically hereinafter, will be apparent to those skilled in the art to which the invention pertains.

Monochloro derivatives of unsaturated nitriles, such as 3-chloroacrylonitrile (2-chlorovinyl cyanide, 1-cyano-2-chloroethylene, Cl—CH=CH—CN), 3-phenyl-3-chloroacrylonitrile (2-phenyl-2-chloro-vinyl cyanide, $C_6H_5$—C(Cl)=CH—CN)

and 2-chloro-1,3-butadienyl cyanide (3-chloro-2,4-pentadienenitrile, $CH_2$=CH—C(Cl)=CH—CN)

and similar compounds, are products of potential industrial interest. They possess many of the properties which make acrylonitrile desirable as a material for copolymerization with 1,3-butadiene to form synthetic rubber. Copolymers of butadiene and such monochloro derivatives of unsaturated nitriles, with or without acrylonitrile or other unsaturated nitrile, possess some distinct advantages over simple copolymers of butadiene and acrylonitrile and over copolymers of butadiene and dichloro derivatives of acrylonitrile and over copolymers of butadiene and styrene containing chloropropionitriles as comonomers.

These monochloro derivatives of unsaturated nitriles may be hydrolyzed in conventional manner to produce the corresponding monochloro unsaturated acids, for example, 2-chloroacrylic acid, and they may be hydrogenated to yield monochloro saturated nitriles, such as 3-chloropropionitrile, in the presence of catalysts such as copper (Reppe and Hoffmann, U. S. Patent No. 1,891,055) and Raney nickel (Winans, U. S. Patent No. 2,334,140). The resulting hydrogenated product, for example, 3-chloropropionitrile, can be dehydrochlorinated to yield acrylonitrile (Pieroh, U. S. Patent No. 2,174 756).

Heretofore, 3-chloroacrylonitrile has been produced as a by-product of the direct substitutive chlorination of acrylonitrile in the vapor phase over active carbon at a temperature between approximately 200° and approximately 550° C. (Long, U. S. Patent No. 2,231,363). The process yields 2-chloroacrylonitrile as the principal product. No other methods for the production of 3-chloroacrylonitrile or other monochloro derivatives of unsaturated nitriles are known.

I have found that acetylene and acetylenic hydrocarbons may be reacted with cyanogen halides to produce monohalogen-substituted unsaturated nitriles. The reaction is facilitated by certain catalysts which are referred to more specifically hereinafter.

Cyanogen chloride is a readily condensible gas having a melting point of approximately −6.5° C. and a boiling point within the range of approximately 12.5 to 15.5° C. It is very soluble in water, alcohol and ether. Cyanogen chloride may be readily prepared by the action of chlorine on hydrogen cyanide. Investigations of methods for the preparation of cyanogen chloride were described by T. Slater Price and Stanley J. Green (J. Soc. Chem. Ind., 1920, vol. 39, pages 98–101T; Chem. Abs., 1920, vol. 14, page 2056). It has been reported that at 37° C. cyanogen chloride does not react with ethylene (Ronald B. Mooney and Hugh G. Reid, J. Chem. Soc. (London), 1931, page 2597).

Reactions similar to those of cyanogen chloride occur with other cyanogen halides, such as cyanogen bromide and cyanogen iodide, but the products are not at present of as great industrial interest as the chloro derivatives of unsaturated nitriles.

In accordance with a specific embodiment of the process of my invention, cyanogen chloride is volatilized and passed through a solution of acetylene in an inert solvent such as hexane or other saturated hydrocarbons. The resulting 3-chloroacrylonitrile may be separated from the unreacted acetylene and solvent by distillation, preferably in the presence of a substance capable of serving as an antioxidant or inhibitor of polymerization.

Instead of using the foregoing procedure, somewhat better yields are obtained when catalysts which promote the addition reaction are used. Cuprous chloride is such as a catalyst and may be used as follows: Into an aqueous solution of cuprous chloride, for example, one consisting of 500 grams of cuprous chloride, 250 grams of ammonium chloride, 30 grams of copper metal powder, 15 cc. of concentrated hydrochloric acid and 1200 cc. of water, are passed streams of acetylene and cyanogen chloride at such flow rates that an approximately equimolecular ratio of reactants is maintained. The catalyst solution is maintained preferably at a temperature of approximately 200° to 210° F. The chloroacrylonitrile that is formed may collect as an oily layer or may be volatilized with the unreacted acetylene and cyanogen chloride, depending on the reaction temperature. If volatilized, it can be separated from the effluent vapors by fractional condensation. The condensed crude chloroacrylonitrile may then be subsequently purified by fractional distillation, using a polymerization inhibitor in this operation. Alternatively, the total effluent may be condensed and the chloroacrylonitrile recovered therefrom and from other products formed in the reaction by fractional distillation.

In accordance with another method for the practice of my invention, which is preferred for certain purposes, cyanogen chloride and acetylene, with or without a diluent gas such as nitrogen, are passed in approximately equimolecular proportions over a solid contact catalyst which promotes the reaction at a temperature within the range of approximately 100° to 400° C. Solid cuprous chloride or cuprous cyanide is a suitable catalyst, although barium cyanide, sodium cyanide, potassium cyanide, and similar alkali and alkaline-earth metal cyanides may be used. Such solid contact catalytic materials, when used in the process of my invention, are preferably deposited or coated on such adsorbent supporting or carrier materials as charcoal, bauxite, fuller's earth and the like. Conventional methods may be used for preparing such supported catalytic materials. For example, a barium cyanide catalyst suitable for use in the process is prepared by impregnating activated charcoal with an aqueous solution of barium cyanide and thereafter heating the resulting material to remove water; such alternate impregnation and drying may be repeated as often as necessary to obtain a catalytic material with the desired content of barium cyanide.

Wide variation is permissible in the proportions of the reactants which are used in the process. These will largely be preselected with a view toward minimizing or obviating the polymerization of one or another of the particular reactants. Generally equimolecular proportions of the reactants are used although, when an excess of one reactant is used, it preferably is the acetylenic hydrocarbon, which is generally less readily polymerized than the cyanogen chloride. In vapor-phase reactions, the use of an inert diluent gas such as nitrogen is generally desirable since the temperatures which are used in such reactions are substantially higher than those used in the liquid-phase processes of the invention.

The reaction which is involved in the production of monochloro derivatives of unsaturated nitriles is believed to be that expressed by the following equation:

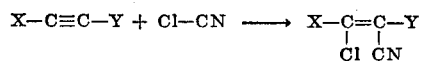

in which X and Y are hydrogen or alkyl radicals and Y is the shorter or has the lower molecular weight of the two, if they are not identical. The cyanide radical of the cyanogen chloride is believed to add to that carbon atom that is connected to the triple bond to which the shortest or the lightest molecular weight substituent is attached and the chlorine is believed to add to the carbon atom adjacent that to which the cyanide radical adds. However, I am not at all certain that such is invariably the rule, since alkyl-substituted acetylenes are not readily available for extensive investigation and since the reaction products are rather complex and have not heretofore been identified in other reactions, so that their separation and identification cannot be readily accomplished. In the reaction of methylacetylene and cyanogen chloride, for example, it has not been established conclusively whether the resulting product is

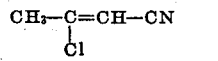

3-chloro-3-methylacrylonitrile or

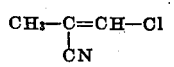

3-chloro-2-methylacrylonitrile because of the difficulty of separation and identification of the products.

Although the foregoing description is directed particularly to the reaction of cyanogen chloride with acetylene, in both vapor and liquid phase, to produce 3-chloroacrylonitrile, it will be obvious that by suitable conventional modification the processes can be readily adapted to the production of other monochloro derivatives of unsaturated nitriles by the reaction of cyanogen chloride and acetylenic hydrocarbons. Suitable acetylenic hydrocarbons for use in such processes are methylacetylene (propyne, allylene), ethylacetylene (1-butyne), dimethylacetylene (2-butyne, crotonylene), vinylacetylene (3-buten-1-yne) as well as aromatic acetylenic hydrocarbons such as phenylacetylene and the like. In connection with acetylenes containing a double bond in the molecule, such as vinylacetylene, it is desirable to maintain the reaction conditions within more critical limits in order to obviate any possible reaction of the double bond. However, a rather wide latitude is permitted between reaction conditions which favor the reaction of a triple bond as in acetylene and those which promote substantial reaction of a double bond.

Examples of preferred methods of practicing the invention are set forth hereinafter, but it is to be understood that these examples are merely illustrative and are not to be construed as limitations of the scope of the invention.

*Example 1*

Into a concentrated solution of acetylene in commercial solvent hexane is passed a slow stream of cyanogen chloride gas while the reaction mixture is maintained at a temperature of approximately 20° C. After substantial amounts of cyanogen chloride pass through the mixture without being absorbed, the resulting products are recovered.

To recover the 3-chloroacrylonitrile which is formed in the reaction, the product is distilled in the presence of hydroquinone as a polymerization inhibitor, through a fractional distillation column. The unconverted acetylene and cyanogen chloride are expelled first and thereafter the solvent hexane and 3-chloroacrylonitrile are recovered. A substantial yield of the latter is obtained.

*Example 2*

Cuprous chloride solution is prepared by adding 500 grams of cuprous chloride, 250 grams of ammonium chloride, 30 grams of copper metal powder, and 15 cc. of concentrated hydrochloric acid to 1200 cc. of water. The solution is placed into a flask provided with a stirrer and two gas inlet tubes discharging beneath the surface of the solution and an outlet tube. The flask is heated to approximately 95° C. and maintained at that temperature while slow streams of methylacetylene and cyanogen chloride preheated to approximately 50° C. are passed into the flask at about equal gas flow rates. After a substantial portion of an oily material has been formed, the passage of the gases to the mixture and the stirring are stopped. The oily layer is separated and the chloro derivatives of methylacrylonitrile are recovered by fractional distillation.

*Example 3*

Acetylene and cyanogen chloride preheated to approximately 200° C. are charged at approximately equal volumetric rates to a mixing zone where the combined stream is further mixed with nitrogen gas preheated to approximately 200° C. in the proportion of 2 volumes of nitrogen to each volume of mixed reactant stream. The combined streams are then passed over a catalyst consisting of barium cyanide deposited on adsorbent charcoal that is disposed in a catalyst tube. The effluent is fractionally condensed, so that the 3-chloroacrylonitrile produced is separated from the lower-boiling acetylene, cyanogen chloride and nitrogen.

The crude condensed 3-chloroacrylonitrile is subsequently subjected to fractional distillation in the presence of a polymerization inhibitor, whereby a good yield of the desired product is obtained.

*Example 4*

Phenylacetylene is substituted for acetylene in Example 3 and the process is conducted substantially as described in Example 3. The product obtained contains a substantial proportion of 3-phenyl-3-chloroacrylonitrile.

*Example 5*

By substituting a catalyst consisting of cuprous cyanide deposited on bauxite for the catalyst of Example 3 and otherwise conducting the process as therein described, a good yield of 3-chloroacrylonitrile is obtained.

Although the foregoing description comprises preferred embodiments of my invention, it is to be understood that variations and modifications may be made therein without departing substantially from the scope of the invention or the appended claims and that the invention is not to be limited except as specified in the appended claims.

I claim:

1. A process for the production of a monohalo derivative of an unsaturated nitrile which comprises reacting a mixture of acetylenic hydrocarbon and a cyanogen halide at a temperature in the range from 20° to 400° C.

2. A process for the production of a monochloro derivative of an unsaturated nitrile which comprises reacting a mixture of acetylenic hydrocarbon and cyanogen chloride at a temperature in the range from 20° to 400° C.

3. A process for the production of 3-chloroacrylonitrile which comprises reacting a mixture of acetylene and cyanogen chloride at a temperature in the range from 20° to 400° C.

4. A process for the production of a monochloro derivative of methylacrylonitrile which comprises reacting a mixture of methylacetylene and cyanogen chloride at a temperature in the range from 20° to 400° C.

5. A process for the production of 3-phenyl-3-chloroacrylonitrile which comprises reacting a mixture of phenylacetylene and cyanogen chloride at a temperature in the range from 20° to 400° C.

6. A process for the production of a monochloro derivative of an unsaturated nitrile which comprises reacting a mixture of acetylenic hydrocarbon and cyanogen chloride in the presence of a cuprous salt at a temperature in the range from 20° to 400° C.

7. A process for the production of a monochloro derivative of an unsaturated nitrile which comprises reacting a mixture of acetylenic hydrocarbon and cyanogen chloride in the presence of a solid contact catalyst comprising a substance selected from the group consisting of cuprous chloride, cuprous cyanide, and alkali and alkaline earth cyanides at a temperature in the range from 100° to 400° C.

8. A process for the production of a monochloro derivative of an unsaturated nitrile which comprises passing in vapor phase a mixture of an acetylenic hydrocarbon and cyanogen chloride at a temperature within the range of approximately 100° to approximately 400° C. into contact with a solid contact catalyst comprising a substance selected from the group consisting of cuprous chloride, cuprous cyanide and alkali and alkaline-earth metal cyanides.

9. A process for the production of 3-chloroacrylonitrile which comprises passing in vapor phase a mixture of acetylene and cyanogen chloride at a temperature within the range of approximately 100° to approximately 400° C. into contact with a solid contact catalyst comprising a substance selected from the group consisting of cuprous chloride, cuprous cyanide and alkali and alkaline-earth metal cyanides.

10. A process for the production of 3-chloroacrylonitrile which comprises passing in vapor phase a mixture of acetylene and cyanogen chloride at a temperature within the range of approximately 100° to approximately 400° C. into contact with a solid contact catalyst consisting of cuprous cyanide deposited on bauxite.

11. A process for the production of 3-chloroacrylonitrile which comprises passing in vapor phase a mixture of equal volumes of acetylene and cyanogen chloride diluted with nitrogen in the proportion of 2 volumes to each volume of acetylene and cyanogen chloride at a temperature of 200° C. over a catalyst consisting of cuprous cyanide deposited on bauxite, and recovering 3-chloroacrylonitrile so produced from the resulting effluent.

HARRIS A. DUTCHER.

REFERENCES CITED

The following references are of record in the file of this patent:

UNITED STATES PATENTS

| Number | Name | Date |
|---|---|---|
| 2,326,095 | D'Ianni | Aug. 3, 1943 |
| 2,325,984 | Sarbach | Aug. 3, 1943 |
| 2,324,854 | Kurtz et al. | July 20, 1943 |
| 2,322,696 | Kurtz et al. | June 22, 1943 |

FOREIGN PATENTS

| Number | Country | Date |
|---|---|---|
| 116,654 | Australian | Mar. 11, 1943 |

OTHER REFERENCES

Auwers et al., Liebig's Annalen, vol. 492, pp. 283–292, 1932.